United States Patent [19]

Ericson et al.

[11] Patent Number: 4,551,355

[45] Date of Patent: Nov. 5, 1985

[54] HIGH SPEED COATING PROCESS FOR MAGNETIC DISKS

[75] Inventors: Charles P. Ericson, St. Paul; Bahram Shadzi, Richfield, both of Minn.

[73] Assignee: Magnegic Peripherals, Minneapolis, Minn.

[21] Appl. No.: 614,882

[22] Filed: Jul. 26, 1984

Related U.S. Application Data

[63] Continuation of Ser. No. 504,638, Jun. 15, 1983, abandoned.

[51] Int. Cl.$^4$ ............................................. H01F 10/02
[52] U.S. Cl. ..................................... 427/48; 427/128; 427/130; 427/425; 427/427
[58] Field of Search ......................... 427/48, 128–132, 427/425, 427; 428/900, 694

[56] References Cited

U.S. PATENT DOCUMENTS 4,001,463  1/1977  Schaefer et al. ....................... 427/48

Primary Examiner—Bernard D. Pianalto
Attorney, Agent, or Firm—Edward L. Schwarz; Joseph A. Genovese

[57] ABSTRACT

A disk is rotated at high speed on a spindle while fluid carrying magnetic medium material is applied to the disk through a dispensing nozzle which starts at the outside diameter of the disk and travels to the inside diameter, pauses momentarily, and then travels back to the outside diameter. As the fluid is applied, a thin film of medium material adheres to the disk while the excess fluid forms a protective coating over this thin film as it flows radially off of the disk due to the centrifugal force generated by the high speed of rotation. The nozzle discharge pressure and the high rotational speed of the disk result in a very thin film of magnetic medium material being applied to the disk. The rate of nozzle travel can be adjusted to vary the medium material film thickness. Immediately following the high speed coating application step the speed of the disk is substantially reduced and the disk is exposed to a magnetic orienting field during an orientation step. The speed of the disk is then increased again during a very short drying step.

8 Claims, 5 Drawing Figures

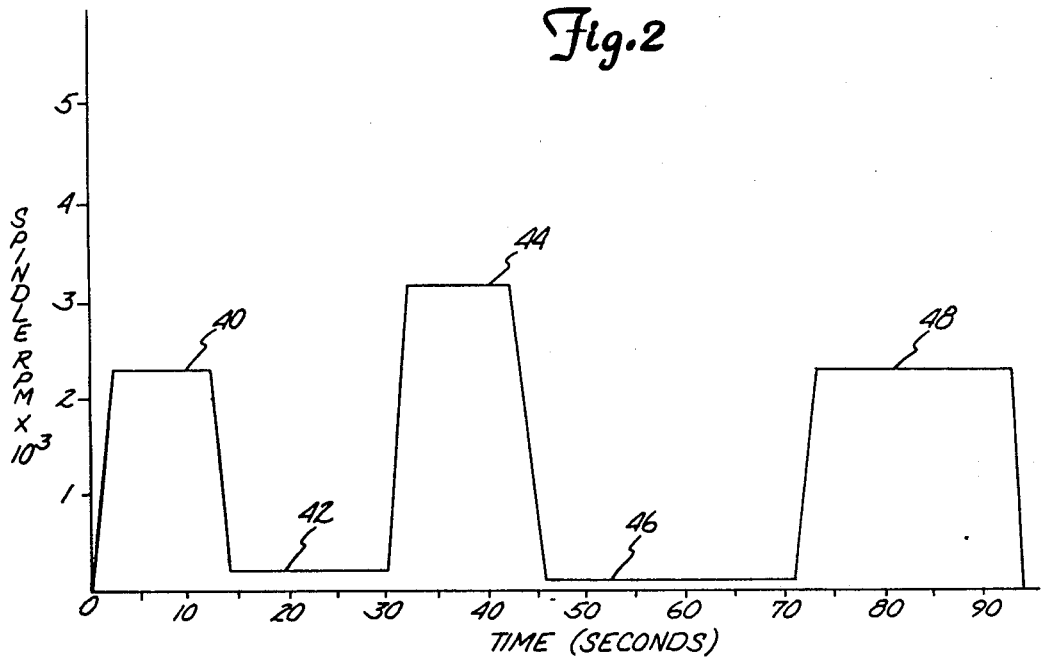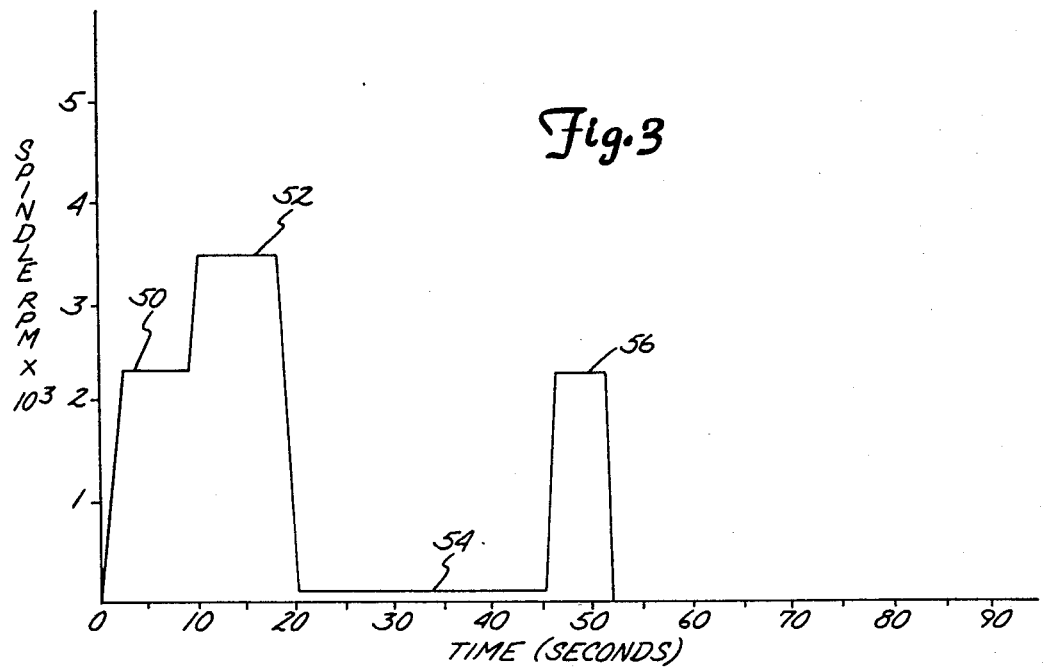

HIGH SPEED COATING PROCESS FOR MAGNETIC DISKS

This is a continuation of application Ser. No. 504,638 filed June 15, 1983, abandoned.

BACKGROUND

The invention relates to processes for applying magnetic medium material to a disk.

In the past, fluid carrying magnetic medium material has typically been applied while the disk is rotated at low speed, with the speed of the disk then being increased during a high speed spin-out step to spin excess medium material off of the disk by means of centrifugal force. See, for example, U.S. Pat. Nos. 4,353,937; 4,133,911; and 3,198,657. The disk was then processed through a magnetic orientation step and a drying step before being baked and polished. The polishing was done both to improve the surface finish of the disk and to reduce the thickness of the media film applied to the disk.

Since the fluid carrying magnetic medium material was applied to the disk at a very low speed, the fluid would undergo very rapid viscosity changes prior to the high speed spin-out step which resulted in a relatively thick film of medium material ultimately adhering to the disk.

The process also provided ample opportunity for air-borne particles to settle on the disk and later cause radially directed runs to form during the high speed spin-out step as the fluid would attempt to flow around the particle as it was spun radially off of the disk. In addition, circumferentially directed scratches were caused during the polishing operation where a particle was picked up by the polishing tape. Furthermore, coating flaws known as "wraparounds" have occurred wherein the fluid flows from one side of the disk around the edge to the other side of the disk.

SUMMARY

The present invention avoids the problems of the prior art by providing a thin film magnetic coating of high quality surface finish such that the existing post-coating polishing operation can be eliminated.

According to the presently preferred process, the disk is rotated at high speed during the coating application step as the fluid dispensing nozzle travels from the outside diameter of the disk to the inside diameter and then back to the outside diameter of the disk again. Due to the great centrifugal force of the high speed of rotation, and the higher discharge pressure of the nozzle, only a very thin film of medium material ultimately adheres to the disk. Excess medium material flows over the thin film as it is spun off of the disk to form a protective layer over the film, preventing rapid changes in viscosity. The high speed spin-out step is eliminated, and immediately following the high speed coating step, the disk is reduced in speed and exposed to an orienting magnetic field during the orientation step. Due to the fact that viscosity changes of the fluid have been minimized, the magnetic particles in the fluid are more susceptible to proper alignment in the direction of the orienting magnetic field than was the case in the previous process, and consequently, the recording quality of the media produced is improved. Moreover, due to the fact that the medium film is much thinner than in the past and of higher surface quality, the polishing step is eliminated. In addition, the media has much less exposure to air-borne particles and other contaminants than has been the case in the past, and therefore, is less subject to contamination.

Consequently, whereas in the past the spin-out speed and the spin-out time, as well as the fluid viscosity, primarily determined coating thickness, now the high speed spin-out step is eliminated; and the disk speed during fluid application, the nozzle rate of travel, and the nozzle discharge pressure, along with the minimization of viscosity changes made possible by the present process, determine the coating thickness and properties. Hence, the process of the new invention results in a complete shift in coating parameters as compared to the prior process.

It is therefore an object of the present invention to provide an improved process for applying fluid carrying magnetic medium material to a disk.

It is a further object to provide a process wherein a very thin film of magnetic medium material on the order of 10–20 microinches, can be applied to the disk without a postcoat polishing operation.

Still another object is to provide a process for applying magnetic medium material to a disk which provides a high quality surface finish such that postcoat polishing is not required.

Yet another object is to provide a process for applying magnetic medium material to a disk while the disk is being rotated at high speed.

Still another object is to provide a process for applying magnetic medium material to a disk wherein the disk is immediately exposed to the orienting magnetic field following the application of the magnetic medium material to the disk.

Yet another object is to provide a process for applying fluid magnetic medium material to a disk wherein viscosity changes in the fluid prior to the magnetic orientation step are minimized.

Still yet another object of the present invention is to provide a process for applying magnetic medium material to a disk which virtually eliminates coating flaws such as runs, polishing scratches, and wraparounds.

Still yet another object is to provide a process for applying magnetic medium material to a disk which requires only dry buffing, rather than polishing by means of processes requiring polishing oils and solvents.

These and other objects, advantages, and novel features of the present invention will become apparent from the following detaled description of the invention taken in conjunction with the accompanying drawings.

BRIEF DESCRIPTION OF THE FIGURES

FIG. 2 is a disk rotational speed versus time graph illustrating the prior art process.

FIG. 3 is a disk rotational speed versus time graph showing the improved process of the present invention.

DESCRIPTION OF THE PRESENTLY PREFERRED EMBODIMENT

Figure 1:
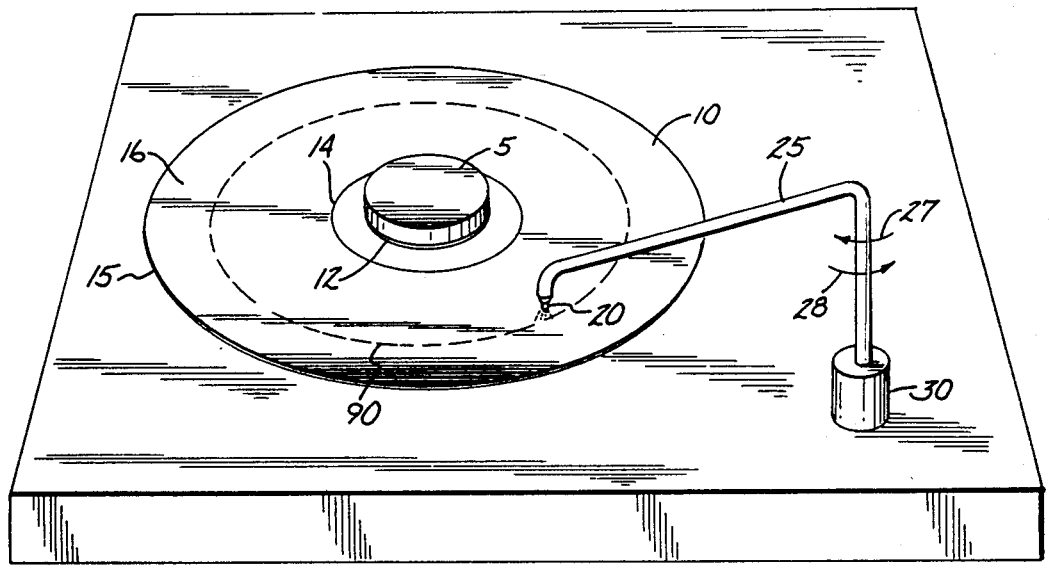
FIG. 1 is a perspective view of a simplified magnetic coating apparatus on which the improved process of the present invention can be performed.

FIG. 1 shows a simplified disk coating apparatus 1 on which the process can be performed. Only the very basic structure of the apparatus 1 is important to the invention, and therefore, the details of the apparatus 1 are not shown. Apparatus 1 includes a rotating spindle 5 which has a variable rotational speed of up to at least 3800 rpm, for example. The spindle 5 is rotated by a power source not shown. A disk 10 upon which the magnetic medium material is to be applied has a central aperture 12 which is secured for rotation to spindle 5 by any suitable mechanism. Disk 10 has an inside diameter 14 and an outside diameter 15 which define the concentric region 16 of disk 10 upon which magnetic medium material will be applied. A magnetic medium material dispensing nozzle 20 is supported by an arm 25 which is in turn pivoted by a motor 30 under the control of a control system (not shown). Arm 25 includes a fluid conduit (not shown) which connects nozzle 20 to the pressurized source of the fluid magnetic medium material (not shown). In the preferred embodiment the discharge opening at the tip of nozzle 20 is approximately 0.02 inches. Arm 25 is pivotable by motor 30 in the direction of arrows 27, 28 so that nozzle 20 can travel from outside diameter 15 to inside diameter 14 and back again. The control system for motor 30 determines the rate of travel of nozzle 20 across disk 10. A mechanism may be provided to vary the discharge pressure of nozzle 20.

Having disclosed the basic structure of the apparatus 1, reference is now made to FIG. 2 wherein the prior art process is illustrated by means of a graph showing disk rotational speed versus time.

According to the conventional process of FIG. 2, the disk is first rotated at approximately 2300 rpm for 10 seconds during step 40 while the disk is lightly wiped with a lint-free cloth saturated with a cleaning solution to free the surface from any air-borne fines or particulates. The speed of the disk is reduced to 150-250 rpm for 16-18 seconds in step 42 while the fluid carrying the magnetic medium material is supplied by means of nozzle 20 as the nozzle 20 moves from outside diameter 15 to inside diameter 14 and then back to outside diameter 15. The discharge pressure of nozzle 20 is approximately 2.0-3.0 psig. Step 44 is the high speed spin-out step wherein the speed of the disk is increased to 3000-3400 rpm for approximately 8-12 seconds to spin excess media off of the disk and thereby define the thickness of the magnetic medium film applied to the disk. In orientation step 46, the speed of the disk is reduced to 50-60 rpm for 15-25 seconds while the disk is immersed in a magnetic field to attempt to properly orient the magnetic particles of the medium layer just applied to the disk. In drying step 48, the speed of the disk is increased to 2300 rpm for 20-25 seconds to accelerate the drying of the medium film. Next, the disk is processed through the normal baking and polishing steps.

Figure 4:
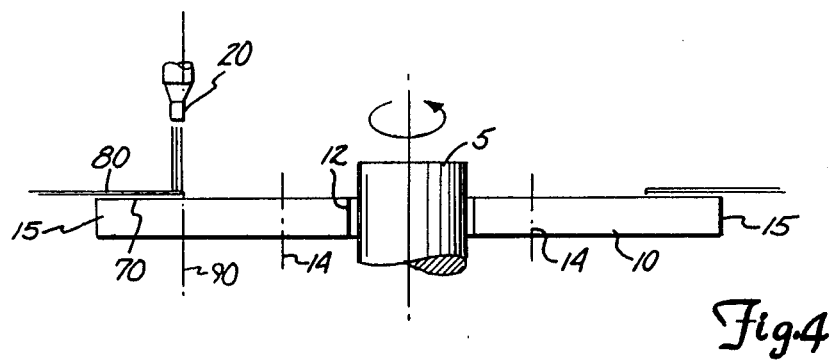
FIG. 4 is a cross-sectional elevational view showing the nozzle 20 applying fluid carrying magnetic medium material to the disk and moving from the outside diameter of the disk towards the inside diameter.
Figure 5:
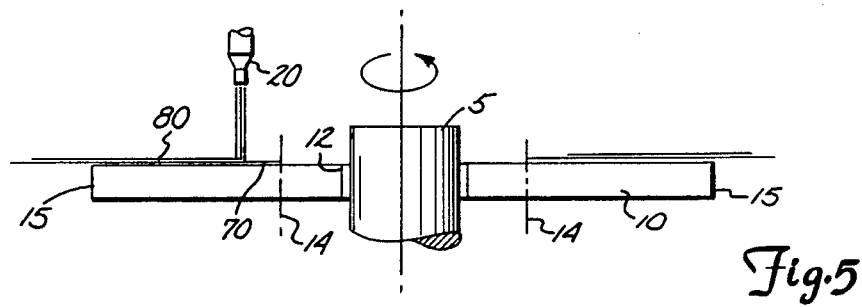
FIG. 5 is a cross-sectional elevational view showing nozzle 20 applying fluid to the disk while returning from the inside diameter of the disk and moving towards the outside diameter of the disk.

Having described the conventional process of FIG. 2, the improved process of the present invention is shown in FIG. 3. The process of the present invention also begins with a solvent washing step 50 during which the disk is rotated at 2300 rpm (approximately) for 10 seconds (approximately) while it is lightly wiped with a lint-free cloth saturated with a cleaning solvent to free the surface of any air-borne fines and particulates. Hopefully, this step can be eliminated in the future through better disk handling procedures prior to the disk 10 being placed on spindle 5. Immediately following solvent washing step 50, the speed of the disk is increased in step 52 to 3000-3800 rpm (approx.) for 8-9 seconds (approx.) while nozzle 20 dispenses fluid carrying magnetic medium material at a nozzle discharge pressure of 6-8 psig (approx.) starting at outside diameter 15 and moving to inside diameter 14, pausing at inside diameter 14 for approximately 1 second, and then returning to outside diameter 15 at a rate of travel of approximately 1.2 inch/second. FIGS. 4 and 5 illustrate the application of the fluid carrying the magnetic medium material to disk 10 during step 52. The fluid magnetic medium material comprises iron oxide particles suspended in a polymeric binder composition. As shown in FIG. 4, as the nozzle 20 moves from outside diameter 15 towards inside diameter 14 a thin film of fluid 70 adheres to the surface of the disk while an excess (nonadhering) fluid layer 80 flows from the nozzle point of travel 90 radially outward towards the outside diameter 15 and then off disk 10 due to the centrifugal force generated by the high rotational speed of disk 10. The high speed rotation of disk 10 insures that only a very thin film of medium material 70 adheres to the disk and in addition insures that the protective layer 80 extends over the entire concentrically shaped disk surface disposed radially outward from the point of travel 90 of nozzle 20. The excess medium material layer 80 acts as a protective layer while the nozzle 20 moves from outside diameter 15 to inside diameter 14 preventing the underlying film 70 from evaporating and undergoing rapid viscosity changes. Once nozzle 20 reaches inside diameter 14, it pauses momentarily (approximately 1 second) to insure that the edge of the media film 70 is well-defined at inside diameter 14. Nozzle 20 then moves radially outward back towards outside diameter 15. As shown in FIG. 5, as nozzle 20 moves back towards outside diameter 15, protective layer 80 also advances back towards the outside diameter 15 exposing the thin medium material film 70 to the admosphere. The rate of travel of nozzle 20 is approximately 1.2 inch/second. Once nozzle 20 has reached outside diameter 15, the disk is immediately moved into orientation step 54 of FIG. 3 wherein the speed of disk 10 is reduced to approximately 52 rpm for 10-15 seconds while the disk 10 is exposed to a magnetic orienting field. Note that the disk is exposed to the magnetic orienting field only seconds after the first portions of thin film 70 are exposed to the atmosphere. Consequently, only minimal evaporation and changes in viscosity take place from the time the media is first applied to disk 10 and exposed to the atmosphere to the start of the orientation step. As a result, the magnetic particles of the thin film 70 are much more susceptible to complete orientation along the lines of the magnetic orientation field than was possible with the prior process. Consequently, the quality of the media in the finished product is improved and superior characteristics for magnetic recording result.

A very short drying step 56 follows orientation step 54 with the disk being rotated for no more than 5 seconds at 2300 rpm (approx.) in the absence of the magnetic orienting field to accelerate drying. The medium material film 70 produced by the instant process is much thinner (10 microinches-20 microinches) than was possible with the prior process (30 microinches). Consequently, the film 70 dries much faster than was previously the case and drying step 56 is considerably shortened and may even be eliminated.

Having disclosed the process of the present invention, various advantages and special features of the process will now be discussed.

The overall process is shorter in time than the prior process (55 seconds as compared to 95 seconds). Consequently, production is increased. More importantly, however, this reduced cycle time reduces the period of time that the disk is exposed to atmospheric contaminants and hence coating contamination due to air-borne particles is reduced. This is especially true given the fact that since the coating provided by the present invention is such thinner than was possible before, it drys much faster, and therefore, is in what is known of as a tacky condition for a much shorter period of time. It is while the disk is in a tacky condition that it is most susceptible to contamination from air-borne particles which fall upon and stick to the medium material film. Since the media film of the present invention dries quickly, air-borne particles which fall upon it are not as likely to stick.

Particle contamination is also reduced due to the self-cleaning action of the new process. That is, the higher nozzle discharge pressure and higher rotational speed of the disk during the medium material application step tend to wash away any particles which fall upon the disk. This feature eliminates coating flaws known as "runs". In the prior process, if a particle were lying on the disk during the spin-out step, the fluid would tend to flow around the particle as it was spun radially off the disk resulting in a radially directed "run". In the new process, such particles are generally washed off of the disk.

The wraparound type coating flaw is also eliminated by means of the present process. A wraparound occurs where the fluid flows from one side of the disk around the outside edge of the disk to the other side of the disk during the application or spin-out step. Because of the elimination of the low-speed medium material application and high-speed spin-out steps in favor of the high-speed application step, such wraparounds are prevented.

Other coating flaws are eliminated due to the fact that the new process eliminates the post-coat polishing operation. Due to the thinness of the film produced and its surface quality, polishing is unnecessary. In the past, such polishing was done both to improve surface finish and to reduce the thickness of the medium material film. Thinner magnetic films permit denser recording of information on the disk. Polishing was conventionally done by means of a rotatably powered abrasive nylon tape and a polishing solvent applied to the disk while it was being polished by the tape. If the tape picked up a particle lying on the disk during the polishing operation a circumferential scratch would often result. Moreover, the polishing solvent would often introduce contaminants onto the disks surface and was very difficult to completely remove following the polishing operation. By eliminating the need for a polishing step, circumferential scratches on the medium surface and contamination caused by the polishing solvent, as well as other related problems, are also eliminated. Disks which have been produced by means of the process of the present invention require only a light dry buffing rather than polishing with solvents.

It has been noted that a thinner magnetic film can be applied to the disk using the improved process due primarily to the high rotational speed of the disk during the application of the coating and the nozzle discharge pressure. In the past, where the magnetic fluid was applied at low speed, the viscosity of the fluid would increase rapidly once exposed to the atmosphere, and hence, the fluid flowed less freely once the high speed spin-out step began and more medium material adhered to the disk during that high speed spin-out step. Another factor which affects the thickness of the coating applied to the disk is the travel speed of the nozzle particularly as it moves from inside diameter 14 back to outside diameter 15. Interestingly, where the arm travel is slowed down, the thickness of the film is reduced. This indicates that the pressure of the fluid stream discharged from nozzle 20 digs away at the film 20 as the nozzle is returning from inside diameter 14 back to outside diameter 15 and confirms the fact that both nozzle discharge pressure and arm travel speed affect film thickness.

It is extremely important that the apparatus employed to practice the process of the present invention provide for smooth travel of the nozzle 20. Where the nozzle 20 vibrates, especially in returning from inside diameter 14 to outside diameter 15, a corresponding thickness variation will result, appearing as a circumferential thin spot on the film. Consequently, while the nozzle 20 is shown to be supported by a pivoting arm 25, the invention is not limited to use with such a structure, and other means of moving nozzle 20 between outside diameter 15 and inside diameter 14 may be more suitable.

Having disclosed the presently preferred embodiment of the invention, many modifications and variations thereof will be obvious to those skilled in the art, and accordingly, the invention is intended to be limited only by the scope of the appended claims.

We claim:

1. In an apparatus having a spindle rotatable by a power source, a disk having an inside diameter and an outside diameter and a central opening, said disk being secured for rotation with said spindle at said central opening, and a nozzle for dispensing magnetic medium material at a nozzle discharge pressure onto said disk, said nozzle being moveably mounted with respect to said disk and being moveable between said outside diameter and said inside diameter, a method for applying a magnetic medium to said disk, comprising the steps of:

rotating said disk at a rotational speed of at least 3000 rpm;

during said disk rotating step, applying said magnetic medium material to said disk from said nozzle at a nozzle discharge pressure of about 6–8 psig. as said nozzle moves at a rate of travel between 1.0 and 1.5 inch/second from said outside diameter to said inside diameter and returns;

reducing the rotational speed of said disk almost immediately following said medium material applying step to a speed suitable for magnetic orienting the medium; and exposing said disk to a medium-orienting magnetic field during said period of reduced rotational speed.

2. The method of claim 1 wherein said nozzle moving step includes pausing for an approximate 1 second time period before returning from said inside diameter to said outside diameter.

3. The method of claim 1 wherein said nozzle moving step includes moving from said outside diameter to said inside diameter, at a rate of travel of said nozzle of approximately 1.2 inch/second.

4. The method of claim 1 further comprising a drying step following said medium-orienting step, the rotational speed of said disk being increased during said drying step to accelerate the drying of said film.

5. The method of claim 1 wherein said coating application step has a duration of between 7 seconds and 10 seconds.

6. The method of claim 1 wherein said rotational speed during said coating application step is in the range from 3000-3800 rpm.

7. The method of claim 1 wherein said coating application step has a duration in the range of 7-10 seconds, and wherein during said coating application step said rotational speed is 3000-3800 rpm.

8. The method of claim 1, wherein the medium material-applying step includes the step of spraying the medium material from a nozzle whose diameter is approximately 0.020 inch.

* * * * *